Sept. 1, 1970 R. F. H. McCOY 3,526,900
METHOD AND SYSTEM FOR RECORDING SAMPLED SIGNALS ON
A CONTINUOUS RECORDING MEDIUM
Filed March 8, 1968 5 Sheets-Sheet 1

WITNESSES:
Bernard R. Gieguez
Leroy M. Gamman

INVENTOR
Reginald F. H. McCoy
BY R. Lewis Gable
ATTORNEY

United States Patent Office 3,526,900
Patented Sept. 1, 1970

3,526,900

METHOD AND SYSTEM FOR RECORDING SAMPLED SIGNALS ON A CONTINUOUS RECORDING MEDIUM

Reginald F. H. McCoy, Dumont, N.J., assignor to Westinghouse Electric Corporation, Pittsburgh, Pa., a corporation of Pennsylvania Filed Mar. 8, 1968, Ser. No. 711,773
Int. Cl. G11b *5/02;* G01d *15/12;* H04n *7/12*
U.S. Cl. 346—74 12 Claims

ABSTRACT OF THE DISCLOSURE

This invention relates to a method and system for recording low bandwidth signals of an analog nature onto a continuous medium such as a magnetic disk or drum. The low bandwidth signals may illustratively be derived from a source such as a telephone line or a slow scan television system and are applied to a rotating magnetic drum in a manner that the leading edges of the pulses convey the desired signal information and so the recorded pulses may be consecutively read out from the continuous media to provide the desired signal.

BACKGROUND OF THE INVENTION

Field of the invention

This invention relates to methods and systems for recording a low bandwidth signal onto a recording medium having two recording states in such a manner that the signals may be consecutively replayed.

Description of the prior art

It is often desired to transmit or store signals upon a media whose bandwidth is significantly smaller than either the source of the signals or the means for displaying the signal. Typically, it may be necessary to transmit a video signal provided by a television camera which is scanned at a high rate upon a transmission line whose bandwidth is significantly less than that of the television signal. In order to transmit the television signal, it will be necessary to sample the video signal to provide a low bandwidth or distributed signal which may be transmitted by the available transmission medium which may take the form of a conventional telephone line. Upon reception of the low bandwidth signal at the end of the telephone line, it will be necessary to convert the low bandwidth signal to a considerably larger bandwidth signal, which may in turn be applied to a typical display such as a cathode ray tube. In the conversion process to provide a low bandwidth signal, the output signal of a television camera is typically stored upon a storage medium so that the stored signal may be regularly sampled at a sufficiently slow rate that the sampled signal may be sent upon the low bandwidth medium. A prime advantage of using such a conversion system lies in the convenience of using telephone transmission lines which are relatively inexpensive compared to the large bandwidth transmission media.

Similarly, it may be desired to place a television signal or other high bandwidth signal onto an inexpensive, small bandwidth media such as tape or a phonograph record. As described in a copending application, entitled "Teaching Methods and Apparatus," by Donald W. Laviana, Ser. No. 371,360, now abandoned, television signals may be stored upon a phonograph record by converting a high bandwidth signal to a low or narrow bandwidth signal to be placed upon the phonograph record. A phonograph record recorded in this manner may be played upon a conventional record player in a classroom to provide images upon a cathode ray tube, which is scanned at normal television rates.

One of the problems associated with bandwidth conversion systems of the prior art is that of selecting the appropriate mode of storing the wide bandwidth signal upon the storage medium and of sampling periodically the storage medium to provide a low bandwidth, distributed signal. After transmission, the low bandwidth is typically reconverted by building up the distributed signal on a storage medium to be readout at a rapid rate to provide a high bandwidth signal. In order to display the transmitted signal upon a conventional cathode ray tube, it is necessary to store the low bandwidth, distributed signal until enough information is built upon the storage medium to provide a single frame of the signal and then to rapidly readout in a prescribed order the information at a frame rate sufficiently high to avoid flicker in the displayed image. As described in the above-identified copending application, a pair of electrical-in and electrical-out storage tubes may be used to alternately store and to readout the electrical signal to be applied to the cathode ray tube. More specifically, the tubes may illustratively include a first electron gun which writes at a slower rate corresponding to the bandwidth of the low bandwidth signal a pattern of charges upon a target. The charge pattern is then "readout" by a second electron gun to provide a signal to be applied to the cathode ray tube. Typical electrical-in, electrical-out storage tubes suffer the disadvantages of poor resolution, low signal strength, and poor half tone capability due to the difficulties associated with repeated readout of the charge pattern deposited upon the target. In addition, it is difficult to provide exact registration between the first and second electron guns which provides additional distortion in the output signal.

In view of the technical difficulties associated with electrical-in, electrical-out storage tubes, as well as their high cost, it has been suggested to incorporate continuous loop storage media such as magnetic disks or drums into bandwidth conversion systems. It has been suggested that the distributed, low bandwidth signal be recorded while the storage disk is rotated at a slow rate and that a high bandwidth signal be derived by rotating at a higher speed. However, the time loss due to the increasing of the speed of the video disk would be excessive and would reduce the number of pictures which could be displayed in a given period. Therefore, the magnetic disk or drum should be rotated at a constant speed, and the distributed signal should be selectively recorded upon the magnetic drum in such a manner, that the pulses may be continuously readout to provide a video signal. A method of sampling to provide the distributed signal is more completely explained in the copending application entitled "Method and System of Bond Compression for Video Signals," Ser. No. 711,690, filed Mar. 8, 1968, by G. F. Newell and G. C. Sziklai.

A major difficulty encountered with magnetic media such as tapes, disks or drums is the non-linear magnetization characteristic of the media. Because of the non-linear characteristics, it is desirable to record upon the magnetic media signals having only two possible states. Such signals may then be recorded by magnetising the medium to saturation in one or the other polarity. As a result, the variations in amplitude of the recorded waveform do not result in amplitude variations in a demodulated signal. Further, such techniques eliminate the effect of variations of frequency response on reproduction when a high frequency carrier is used to convey the signal.

One well known method of recording analog information in a two state form involves the use of a carrier which is frequency modulated by the input signal, the amplitude of the carrier being constant and sufficient to saturate the magnetic media. Such a frequency modulated carrier has a number of side bands above and below the carrier frequency. However, one side band is sufficient to convey the information and the others may be suppressed. The minimum bandwidth required for such a system is equal to the bandwidth of the information signal plus the frequency deviation of the carrier. However, this method of recording is only applicable when the input signal occurs in the same time sequence as required for replay or readout. In contrast, where distributed, low bandwidth signals are recorded on a storage medium to be readout consecutively at a higher rate, it is typically required to record adjacent samples of the distributed low band signal on different revolutions of the magnetic drum. If a frequency-modulated carrier were used, the number of cycles of the carrier frequency which would occur during one revolution of the drum (or disk) would not be constant, and when adjacent samples are recorded on the next revolution, the phase of the carrier, relative to that record previously, would have a random value. During the readout (or playback) from the storage medium, there would be an abrupt phase change between one sample and the next. These phase changes or steps are equivalent to transient, frequency variations and would appear as spurious impulses in the demodulated signals. Therefore FM carrier techniques of recording a signal upon a magnetic media are unsuited for converting a distributed, low bandwidth signal to a wide bandwidth signal.

Alternative methods of recording, which would avoid the above problem, involve the use of pulse width modulation or pulse time modulation. In both of these methods of recording, one complete pulse is required for each sample of the input signal. Therefore, the minimum bandwidth required is equal to the frequency of the samples when readout. The maximum information bandwidth which can be conveyed by the sample signals is one half of the sampling frequency. Thus, these methods require that the magnetic drum be capable of storing and reproducing a bandwidth twice that of the information signal.

It is therefore an object of the present invention to provide a new and novel method and system for recording a distributed signal onto a storage medium having two polar states so that the signal may be readout to provide consecutive signal.

It is a further object of this invention to provide a new and novel system of recording a low bandwidth signal upon a continuous magnetic medium that utilizes the full bandwidth capabilities of the magnetic medium.

It is a still further object of this invention to provide a new and improved system and method of recording a distributed, low bandwidth signal onto a continuous medium having two recording states in which sampled pulses of the low bandwidth signal may be applied upon different revolutions of the medium without interfering with the subsequent or prior recording of signals in a manner to provide the continuous playback of a wide bandwidth signal.

SUMMARY OF THE INVENTION

These and other objects are accomplished in accordance with the teachings of the present invention by a new and improved method of recording a distributed, narrow bandwidth signal onto a continuous loop storage medium having two storage states such as a magnetic drum or disk. More specifically, a first track of the continuous loop medium is recorded with an integral number of cycles or pulses about the circumference of the medium to provide a continuous waveform devoid of interruptions. The resultant waveform provides a timing reference for the recording of signals upon the medium, and is used to control the state in which the medium is recorded. More specifically, adjacent signals are recorded upon the recording media in the opposite states of the recording medium, for example, if a first signal is recorded upon the medium, in the first storage state, the second signal, which is recorded adjacent to the first signal at a later point in time, is recorded in the opposite (or second) state of the recording medium. Further, the amplitude of the distributed signal is used to accurately time the leading edge of the pulse that is recorded upon the medium. The trailing edge is erased when the subsequntly recorded, adjacent signal is disposed upon the medium. The leading edge of the recorded pulse is timed with respect to the continuous waveform of pulses that is recorded upon a first track and may be reconstituted with respect to the continuous waveform to provide a sginal whose amplitude is proportional to that of the distributed, narrow bandwidth signal. Further, in certain applications, it may be desirable to sample the distributed signal at predetermined points in time and the continuous waveform recorded upon the first track may be used as a clock signal to time the sampling of the distributed, narrow bandwidth signal.

DESCRIPTION OF THE DRAWINGS

These and other objects and advantages of the present invention will become more apparent when considered in view of the following detailed description and drawings, in which.

DECRIPTION OF THE PREFERRED EMBODIMENT

Figure 1:
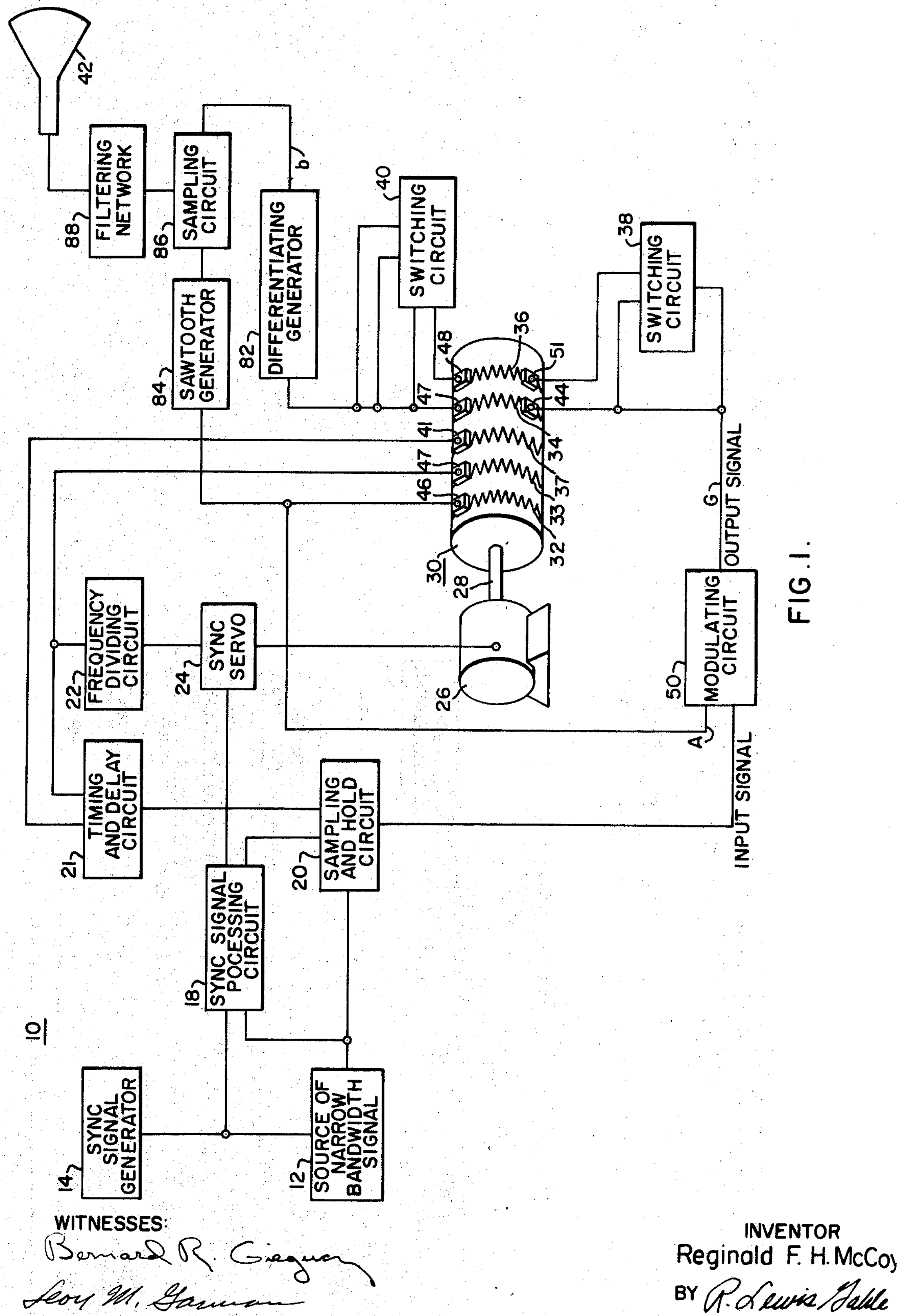
FIG. 1 is a schematic diagram of a system for recording and playing back a distributed signal upon a continuous recording medium, which system includes a phase modulating circuit in accordance with the teachings of this invention.
Figure 3:
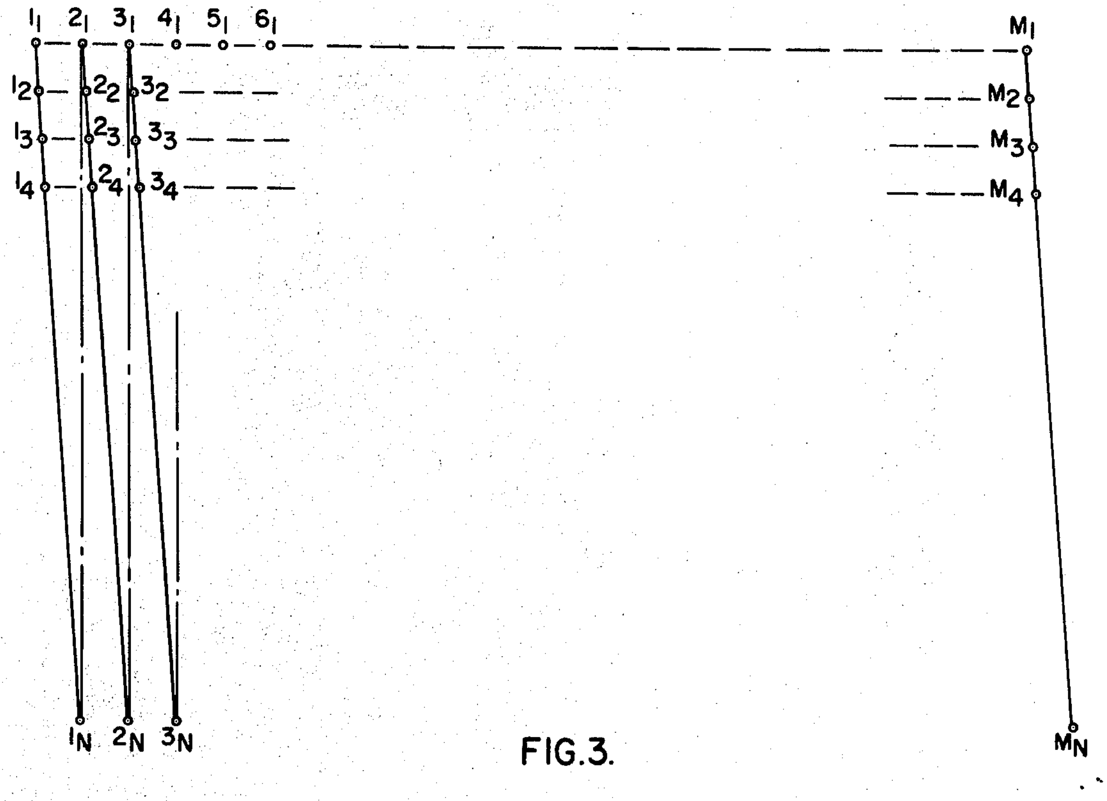
FIG. 3 is a graphical representation of a scan pattern of a television camera device, which may be incorporated into FIG. 1 as the source of a narrow bandwidth signal.

Referring now to the drawings and in particular to FIG. 1, there is shown a system 10 for recording a distributed, narrow bandwidth signal onto a continuous loop storage medium having two storage states such as a rotating, magnetic drum 30. The processing system 10 includes a source 12 of the distributed, narrow bandwidth signal which may illustratively take the form of a slow scan television camera. Alternatively, the source 12 could take the form of a narrow band transmission line such as a telephone cable, a phonograph record or a tape recorder upon which suitable video signals have been recorded. A signal generator 14 is provided for controlling the rate at which the source 12 provides the distributed signal. In the illustrative embodiment in which the source 12 takes the form of a slow scan television camera, the sync generator 14 would control the rate at which the slow scan television camera is scanned. More specifically, the slow scan television camera would be scanned in a vertical pattern as shown by the solid lines of FIG. 3. The slow scan signal derived from the source 12 could be applied to a sync signal processing circuit 18 and to a sampling and hold circuit 20. The slow scan output signal has synchronizing signals impressed thereon corresponding to the periods of the vertical scan and of the period of the field as shown in FIG. 3. The sync signal processing circuit 18 includes a higher frequency oscillator to provide a trigger signal corresponding to the period of the horizontal scan, which signal could be applied to the sampling and hold circuit 20, and a second signal corresponding to the vertical line scan is applied to a sync servo 24. The signal applied to the sampling and hold circuit 20 from the circuit 18 actuates the sampling and hold circuit to accept a signal from the source 12.

The sampling and hold circuit 20 functions to accept and hold a discrete portion of the slow band signal derived from the source 12 and to apply the discrete portion to a pulse modulating circuit 50 upon command of a signal derived from a timing and delay circuit 21. Alternatively, the sync signal generator 14 may apply its synchronizing signal directly to the sync processing circuit 18.

The magnetic drum (or disk) 30 is rotated by a motor 26 which applies a rotational torque through a drive shaft 28 to the storage medium. Illustratively, the continuous loop, storage medium may take the form of the magnetic drum 30. Illustratively, the recording medium 26 could take the form of an aluminum disk or drum having a coating of a suitable ferromagnetic material such as a cobalt-nickel or a cobalt-phosphorous alloy. A first track 32 is recorded continuously about the periphery of the drum 30. In accordance with teachings of this invention, a clock signal, shown as waveform A of FIG. 6, may be prerecorded on the track 32. The clock waveform recorded on track 32 takes the form of alternating pulses, which have been recorded successively in the opposite magnetization or saturation states of the drum 30. Each of the pulses are of substantially equal pulse width. Significantly, an integral number of the pulses are disposed about the periphery of the track 32. A playback head 46 is disposed to playback the clock waveform of line A of FIG. 6 to provide a clock signal which is applied to the pulse modulating circuit 50.

In addition, the storage drum 30 may have additional recording tracks 33 and 37 upon which are prerecorded synchronous or clock signals. The synchronous signals are played back through playback heads 49 and 41 respectively to be applied to the timing and delay circuit 21. In addition, the clock signal derived from track 33 may be applied through a dividing circuit 22 to the sync servo 24. The sync servo 24 functions to compare the prerecorded clock signal to the frame period, sync signal derived from the circuit 18 and to derive an error signal which is applied to the motor 26. The error signal derived from the sync servo 24 serves to accurately control the speed at which the drum 30 is rotated.

The sampling and hold circuit 20 samples discrete portions of the slow scan signal derived from the source 12 and applies the discrete portions of the slow scan signal to the pulse modulating circuit 50 in response to a triggering signal provided by the circuit 21. The sampling and hold circuit 20 functions to compensate for any difference between the application of the input slow scan signal, and the sampling by circuit 50 and the recording of the slow scan signal upon the drum 30.

As will be explained in greater detail later, the low bandwidth signal may be recorded through a head 44 upon a track 34 and may be played back through a head 47 which is connected to a differentiating circuit 82. In turn, the output signal of the differentiating circuit 82 is applied to a sampling circuit 86. The continuous clock waveform derived by the playback head 46 from the track 32 is applied to the sawtooth generator 84, which in turn applies an output signal to the sampling circuit 86. The sampling circuit 86 functions to sample the sawtooth signal provided by the generator 84 at a point in time controlled by the signal applied by the differentiating circuit 82. The resultant signal output from the circuit 86, as will be explained later, is a series of pulses whose amplitude has been restored. The output signal provided by the sampling circuit 86 is applied to a filtering circuit 88 to provide a continuous waveform to a suitable display device such as a cathode ray tube 42.

Illustratively, the source 12 of the distributed narrow bandwidth signals may take the form of a television camera. There will be now explained an illustrative mode of operating the camera to provide a distributed signal to be recorded upon the track 34 of the magnetic drum 30. Referring now to FIG. 3, there is shown a pattern with which the target element of the television camera may be scanned. In a manner well known in the art, a beam of electrons is scanned across the surface of the target element of the television camera in order to read or derive a point by point signal corresponding to the charge pattern established on the target element. As shown in FIG. 3, the target of the television camera is swept in a pattern made up of a plurality of vertical lines or sweeps (as opposed to the normal horizontal mode of scanning). The first vertical sweep begins with point $\mathbf{1}_1$ and proceeds vertically downward to point (or picture element) $\mathbf{1}_N$. During a blanking period, the beam of electrons is brought back to point $\mathbf{2}_1$ and swept vertically down through a second vertical line to point $\mathbf{2}_N$. The entire target is swept in a similar fashion through M number of sweeps depending upon the desired resolution of the horizontal line to be reproduced. As will become clear with further explanation, an object of this invention is to record upon the drum a series of pulses which may be read out in the normal horizontal scan pattern to provide a video image corresponding to the frame of information sensed by the television camera. It is desired to read back at a fast scan rate the information recorded upon the track 34 of the drum 30 in a horizontal scan pattern as indicated by the series of horizontal, dotted lines of FIG. 3. In order to display the first horizontal line of the video image, the series of pulses recorded on the drum 30 corresponding to the points $\mathbf{1}_1, \mathbf{2}_1, \mathbf{3}_1 \ldots M_1$ are played back and applied as will be explained later to the cathode ray tube 42. Subsequently, the next horizontal line of pulses corresponding to the points $\mathbf{1}_2, \mathbf{2}_2, \mathbf{3}_2 \ldots M_2$ will be read out. In a similar manner, each of the pulses recorded upon the drum will be played back horizontal by horizontal line until the entire frame of the video information is displayed upon the cathode ray tube 42.

Figure 4:
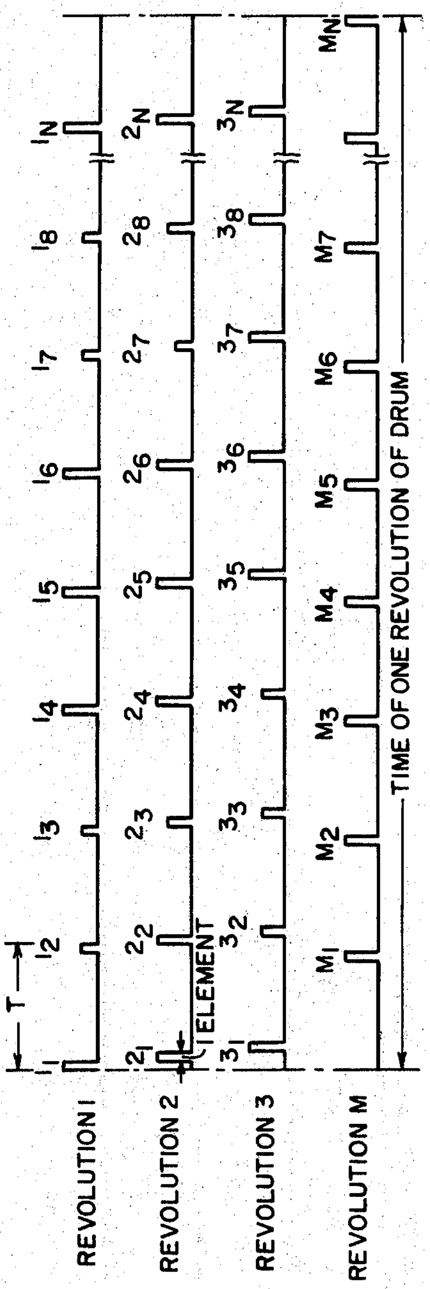
FIGS. 4 and 5 are graphical representations of the recording of pulses upon the recording medium of FIG. 1.

Referring now to FIG. 4, pulses corresponding to the incremental points of the target element of the television camera device are derived from the pulse modulating circuit 50 and applied through the recording head 44 to the track 34 of the drum 30. Reference is made to the above identified copending application by G. F. Newell and G. C. Sziklai, which describes in greater detail a method of building up the slow scan signal onto the magnetic drum. As described in the above identified copending application of Newell and Sziklai, it is illustratively desired to convert the slow scan signal to a fast scan signal displayed in a 525 line, horizontally scanned interlaced frame. As shown in FIG. 4, first line a pulse corresponding to the incremental point $\mathbf{1}_1$ is applied first to the track 34. As the drum is rotated by the motor 26, the subsequent points $\mathbf{1}_2, \mathbf{1}_3 \ldots \mathbf{1}_M$ are recorded during the first revolution of the drum 30. As shown in FIG. 4, the pulses are applied at intervals corresponding to period T. The period T between the pulses is set to equal to a period of the horizontal line of the fast scan signal to be displayed upon the cathode ray tube 42. It is noted that during a single revolution of the drum 30, a single vertical sweep of the target elements of the device is recorded upon the track 30. During the second revolution of the drum 30, the second vertical line of the slow scan signal made up of the elements $\mathbf{2}_1, \mathbf{2}_2, \mathbf{2}_3 \ldots \mathbf{2}_N$ are recorded upon the track 34 of the drum 30. As shown in FIG. 4, the pulses applied during the second revolution of the drum are displaced by an amount equal to the width of a pulse or picture element so that the pulses recorded during the second revolution will not overlap or erase the pulses recorded during the first revolution of the drum 30. The timing of the recording of the pulses is controlled by the sampling and hold circuit 20 which in turn responds to a triggering signal derived from the timing and delay circuit 21. The timing and delay circuit 21 not only serves to apply the pulses at a spacing T corresponding to the horizontal line, but also provides a delay between successive revolutions of the drum 30 to allow pulses recorded on successive revolutions to be recorded adjacent to the previous recorded pulses. As described in the above identified application of Newell and Sziklai, the recording heads 41 and 49 may be connected illustratively through two sets of dividing circuits and integration circuits to a flip-flop circuit. The flip-flop circuit compares the relative waveforms derived from the integration circuits to apply a triggering signal to the circuit 20. A clock signal made up of 525 pulses may be recorded upon track 33 and a clock signal of 2 pulses may be recorded upon track 37. The triggering signal would energize the circuit 20 to apply the slow scan signal at intervals corresponding to the period T and would delay the application of successive vertical lines of the slow scan signal by one picture element for each revolution of the drum 30.

Figure 5:
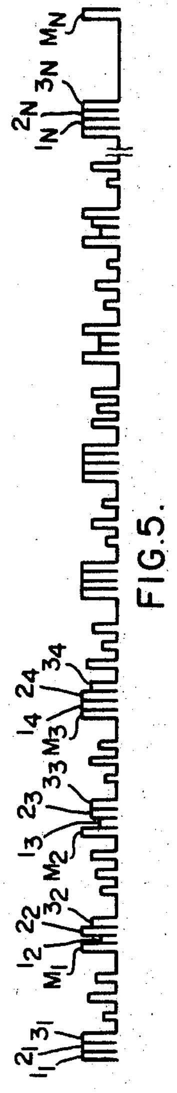

The recording process will continue while the drum 30 is rotating through M revolutions until the entire periphery of the track 32 has been recorded with pulses. As shown in FIG. 4, the pulses recorded on successive revolutions are offset from each other so that pulse $M_1$ immediately precedes the pulse $1_2$ recorded during the first revolution. As explained above, the spacing T is equal to the horizontal scan period and allows the pulses corresponding to one horizontal line to be recorded successively onto the track 34 without interfering or erasing the next horizontal line. FIG. 5 shows that after M revolutions, the pulses are recorded in the order $1_1$, $2_1$, $3_1$, to $M_1$, followed by pulses $1_2$, $2_2$ to $M_2$. In a similar manner the remaining portion of the track 34 is recorded. Thus, when the track 34 is played back through head 47, the series of pulses will appear in a horizontal scan format and may be easily displayed upon the cathode ray tube 42 by conventional techniques. FIGS. 3 and 5 may be compared to see that the pulses $1_1$, $2_1$, $3_1$, to $M_1$ make up the first horizontal line of the frame or image detected by the television camera device. Similarly, the pulses $1_2$, $2_2$, $3_2$, to $M_2$ make up the second horizontal scan of the frame of information. Thus, there has been described above a method of recording at a slower rate during M revolutions of the drum 30 a signal which has been derived by vertically scanning a television camera device, and which may be read off continuously during a single revolution of a drum 30. The series of pulses recorded on the track 34 are readout at a considerably faster rate proportional to the number of revolutions required to record or buildup the signal in horizontal mode. It may be understood that the faster rate realized upon playback is that with which the signal is displayed upon the cathode ray tube 42.

Figure 2:
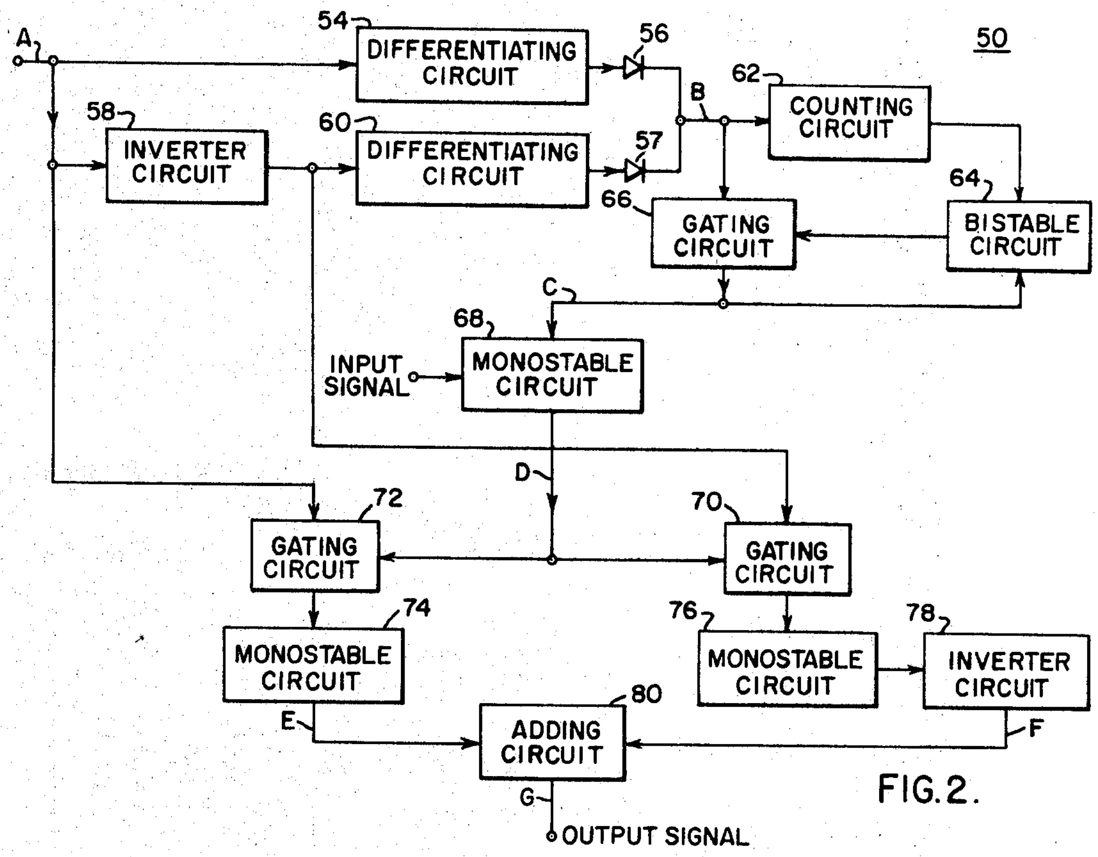
FIG. 2 shows a schematic diagram of the pulse modulating circuit in accordance with the teachings of this invention.
Figure 6:
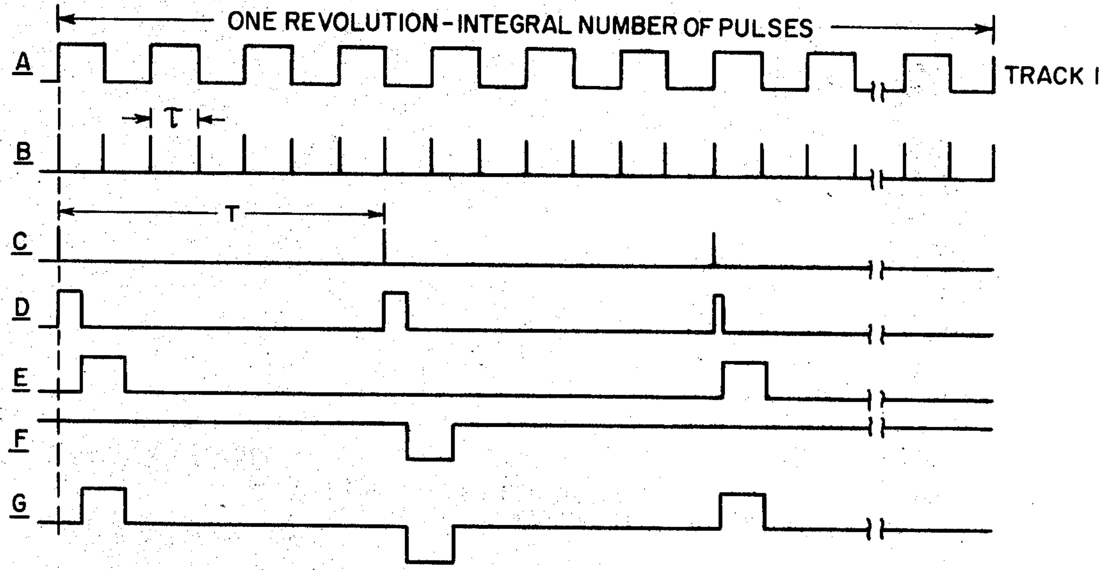
FIG. 6 is a graphical representation of the processing of the signal which takes place within the phase modulating circuit shown in FIG. 2.

Referring now to FIG. 2, the pulse modulating circuit 50 will be described to provide a specific, illustrative embodiment of this invention. The circuit of FIG. 2 is particularly adapted for recording a distributed signal upon a continuous loop of storage medium having first and second storage states. In one important application, the pulse modulating circuit 50 may be used to record a narrow, bandwidth signal as provided by a television camera device onto the magnetic drum 30 to buildup the signal which may be read off at considerably faster rates which are compatible with the scan rates of a normal cathode ray tube. Referring now to line A of FIG. 6, the clock waveform A is permanently recorded on the first track 32 of the magnetic drum 30. The waveform A is made up of a plurality of pulses or cycles of substantially equal width which have been recorded upon track 32 so that an integral number of the cycles occupies the distance about the circumference of the drum 30. As a result, a continuous waveform, devoid of interruptions can be played back through the playback head 46 to derive a timing or clock signal for the entire system 10. Referring now to FIG. 2, it is noted that various points upon the circuit have been designated by capital letters corresponding to the waveforms of signals at these points which are shown in FIG. 6. The continuous, clock waveform A is applied through a first differentiating circuit 54 and a diode 56 to point B. Similarly, the clock waveform A is applied through an inverter circuit 58, a second differentiating circuit 60 and a diode 57 to point B. The circuit 54 operates to differentiate the continuous waveform to provide a series of pulses. The positive going pulses are forward biased through the diode 56. In a similar manner, the continuous waveform is inverted 180° and differentiated by the circuit 60. The negative going edges of the clock wave-form A which are now inverted are differentiated to form a series of positive pulses which are passed through the diode 57. As shown in FIG. 6, the waveform passing through point B represents a series of spikes corresponding to the leading edges of the waveform A which are spaced a distance apart corresponding to the width of a pulse of the waveform A. Waveform B is now applied to a counting circuit 62 which provides an output signal pulse after a predetermined number of the spikes of waveform B have been applied to the circuit 62. The output signal from the counting circuit 62 is applied to a bistable circuit 64 which functions in response to the signal from the circuit 62 to be set in a first or "on" stage from a second or "reset" condition. The output signal from the bistable circuit 64 is applied to a gating circuit 66. As shown in FIG. 2, the waveform B is also applied to the gating circuit 66 and is gated or "turned on" in response to the output signal from the bistable circuit 64. The output signal from the gating circuit 66 takes the form (as shown in line C of FIG. 6) of a series of spikes spaced apart by an interval of time determined by the counting circuit 62. It may be understood that the interval introduced by the counting circuit 62 is equal to T or the period of the horizontal line of the fast scan signal. After providing N number of elements, the counting circuit provides a one element delay before sampling the first element to be recorded during the next revolution of the drum 30. As explained above, the delay is required in order to allow pulses recorded during successive revolutions of the drum to be disposed adjacent to each other so as not to overlap or erase one another. Illustratively, the timing or triggering signal applied to the gating circuit 66 could be derived from a circuit similar to that of the timing and delay circuit 21, an illustrative embodiment of which is further described in the above identified copending application of Sziklai and Newell. As shown in FIG. 2, waveform C is applied to a monostable circuit 68 and to the bistable circuit 64 to reset the circuit 64 to a second or off state. In this illustrative embodiment wherein the signals of the television camera are applied to drum 30, the counting circuit 62 determines that the pulses of waveform C are spaced apart (in time and space) by amounts (as shown in FIG. 4) corresponding to the recording of the pulses through the recording head 44 to the track 34. Thus, though the drawings are not made to the same scale, the spacing between the pulses of waveform C is equal to the spacing between the pulses of FIG. 4. For example, the spacing between pulses $1_1$ and $1_2$ is equal to and is controlled in this embodiment by the spacing of the pulses of waveform C of FIG. 6.

Waveform C is applied to the monostable circuit 68, which generates a pulse waveform as shown at line D of FIG. 6. The width of the pulses of waveform D is controlled by the amplitude of input signal derived from the sample and hold circuit 20. The spikes of waveform C serve to trigger the monostable circuit 68 thereby accurately spacing the pulses of waveform D with respect to each other and insuring that the leading edges of the pulses of waveform D accurately coincide with the edges of the corresponding pulses of the continuous, clock waveform A. The output waveform D derived from monostable circuit 68 is applied to the first and second gating circuits 72 and 70. The continuous, clock waveform A is applied to the gating circuit 72, and is inverted by the circuit 58 and applied to the gating circuit 70. The gating circuit 72 responds to the positive going edge of the waveform A to gate the waveform D, which is then applied to a monostable circuit 74. Similarly, the gating circuit 70 responds to the positive going edge of the signal derived from the inverter circuit 78. It is noted that the output signal derived from the circuit 58 has been inverted and that the circuit 70 will be gated at a time corresponding to the negative going edges of the waveform A to apply the waveform D to a monostable circuit 76. The monostable circuits 74 and 76 operate, in response to the trailing edge of the input signal (i.e., waveform D), to provide pulses of constant width equal to or greater than the width of the pulses of the clock waveform A. It is particularly noted that the leading edge of the waveform D is controlled to correspond to the edge, whether positive or negative of the waveform A and that the trailing edge of the pulses of waveform D is spaced in time distance an amount proportional to the amplitude derived from the slow scan source 12 through the circuit 20. Therefore, the leading edges of the constant width pulses provided by the monostable circuits 74 and 76 (as shown upon lines E and F of FIG. 6) are spaced with respect to the edges of the waveform A distance corresponding to the amplitude of the input signals. The gating circuits 72 and 70 determine in accordane with the polarity of the continuous waveform A which of the monostable circuits 74 and 76 is triggered. Hence if waveform A is positive at the time of sampling, the monostable circuit 74 will be triggered to produce positive pulses as shown in waveform E. If waveform A is negative at the time of sampling, the monostable circuit 76 will be triggered to produce a plurality of pulses whose leading edges are a measure of the amplitude of the input pulses. The output signals of the monostable circuit 76 is applied to an inverter circuit 78 to invert the input signal to provide waveform F. Waveforms E and F are then applied to an adding circuit 80, which adds the waveforms E and F to provide an output signal taking the shape of waveform G. As shown in FIG. 1, the output signal, i.e. waveform G, is applied through the recording head 44 with sufficient amplitude that the magnetic material of drum 30 is saturated to either state depending upon the polarity of the applied pulse.

Figure 7:
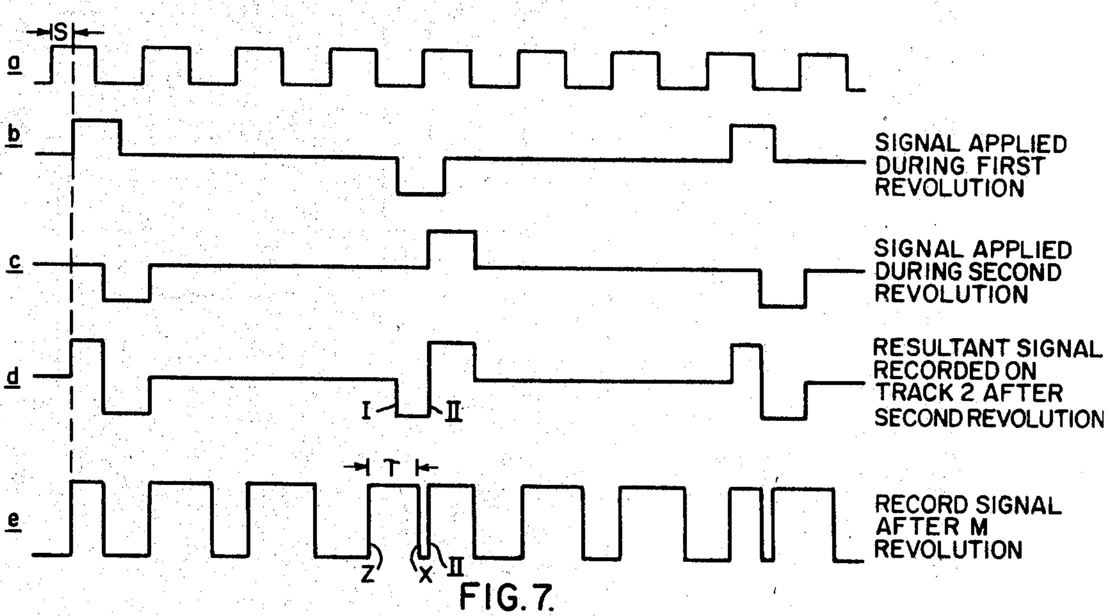
FIG. 7 is a graphical representation of the recording of the distributed pulses upon the recording medium of FIG. 1.

The waveforms of the signal recorded upon the tracks of the drum 30 are shown in FIG. 7. Line *a* of FIG. 7 shows the continuous clock waveform similar to the waveform A of FIG. 6. During the first revolution of the drum 30, the waveform *b* will be recorded upon the track 34 of the drum 30. It may be recognized that waveform *b* is similar to waveform G shown in FIG. 6. The track 34 of the drum 30 will be magnetized to saturation in either the positive or negative polarity as shown in waveform *b* corresponding to the polarity of the waveform G shown in FIG. 6. In other words, the storage medium may be recorded in either a first or second storage state depending upon the polarity of the waveform G. The initial condition of track 34, which remains unchanged in the interval between pulses (as shown by the dotted line of waveform *b*), is unimportant. The timing of the leading edge of the recorded pulse with respect to the continuous, clock waveform *a* of FIG. 7 is the significant information recorded and depends as explained above upon the amplitude of the signal derived from the sample circuit 20 of FIG. 1. As shown in FIG. 7, the leading edge of the pulses of waveforms *b*, *c*, *d* and *e* are spaced the prescribed distance from these corresponding edge of the cycle (or pulse) of the continuous waveform *a*. A series of dotted lines are provided in FIG. 7 to show the spacing of the leading edges of the recorded pulses with respect to the edges of the pulses of the waveform *a*, which spacing is proportional to the amplitude of the input signal. For example, the distance between the leading edge of the first signal recorded upon line waveform *b* with respect to the leading edge of the first pulse of waveform *a* is designated by the letter *s*.

On the second revolution of the drum 30, the adjacent samples or pulses will be recorded and will have an opposite polarity to those pulses recorded during the first revolution. The signal applied during the second revolution is shown at line *c*, and the resultant signal recorded on the drum 30 after the second revolution is shown at line *d* of FIG. 7. It is a significant aspect of this invention that the adjacent signal pulse recorded during the second revolution is of an opposite polarity to that recorded during the first revolution to thereby magnetize the track 34 to saturation in an opposite sense to that state in which the pulse was recorded during the first revolution. As shown in FIG. 4, the signal designated $2_1$ is immediately offset from the signal $1_1$, which is recorded during the first revolution. As explained with regard to FIG. 2, the polarity with which a signal is recorded is controlled by the continuous, clock waveform A. Since the waveform A is positioned in a fixed relation about the circumference of the drum 30 with regard to the second recording track 34, the polarity of the waveform A will control the polarity (or state of saturation) to which a corresponding point on the second track 34 will be recorded. As a result, pulses which are recorded upon the track 34 adjacent to each other will be recorded to opposite remnant states of the magnetic material of the drum 30. As shown in FIG. 7, the pulses of the signal applied during consecutive revolutions magnetize the recording track to opposite states or polarities. Since the width of the pulses is greater than the separation of pulses to be recorded upon track 34, the second set of pulses cause a reversal of the magnetization polarity. As can be seen by comparing lines *b*, *c* and *d* of FIG. 7, the pulse recorded during the second revolution overlaps the pulse of the adjacent pulse recorded during the first revolution of the drum 30. Further, the polarity of the pulse derived during the second revolution is of opposite polarity to the pulse derived during the first revolution. As a result, as seen in line *d*, the pulse derived during the second revolution is recorded over the pulse derived during the first revolution thereby eliminating the trailing edge of the first pulse. However, since the position of the timing of the leading edge of the recorded pulse with respect to the continuous waveform *a* conveys the significant information, the erasing of the trailing edge of the pulse by the subsequent recording of the adjacent signal is immaterial. Thus in the waveform shown at line *d*, the timing of the leading edge I conveys the information of the information of the pulse derived during the first revolution and the timing or positioning of the leading edge II conveys the information of the adjacent sample derived during the second revolution.

This recording process continues on each revolution of the drum with each recording pulse effecting a reversal of the magnetization as controlled by the continuous waveform *a*. At the end of M revolutions of the drum 30, the resultant recording will resemble the waveform as shown at line *e* of FIG. 7. The recorded signal of line *e* is disposed continuously about the track 34 of drum 30 in a fixed relationship with the continuous wave a recorded upon track 32. Further timing of the leading edges of the recorded pulses with respect to the leading edge of the corresponding pulse of the continuous waveform *a* is proportional to the amplitude of the distributed, low bandwidth signal derived from the source 12.

It will be noted that the timing information of the leading edge I (as denoted at line *d* of FIG. 7) corresponding to the first pulse derived during the first revolution has been lost. This leading edge I of the first pulse is erased by the pulse designated by the letter Z in FIG. 7, which pulse is the last pulse to be recorded on the *n*th revolution of drum 30. Pulse Z has a width greater than the separation of the leading edges of waveform *a* and consequently, overlaps the leading edge I of the first pulse recorded during the first revolution. Thus, a spurious edge, indicated by a letter X will be introduced following the leading edge X of pulse by the width T of the recorded pulse. In the present application where television signals in the form of discrete picture elements separated by a long interval are to be recorded for readout at a later time at a fast rate, the spurious leading edge X can be arranged to fall in a blanking interval of the television waveform and therefore would not disturb the output signal.

Figure 8:
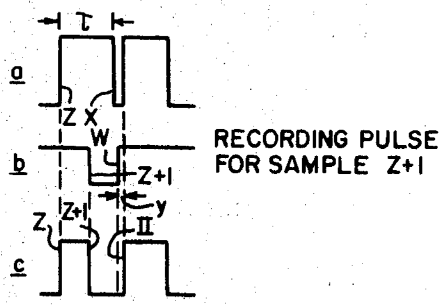
FIG. 8 is a graphical representation of an alternative method of recording the last pulse onto recording medium of FIG. 1 so as to avoid spurious output signals.

If, however, the presence of the spurious pulse is objectionable, it can be avoided by recording one further sample, using a recording pulse which, unlike the preceding pulses, is made shorter than the width of the pulses of waveform *a* of FIG. 7. Referring now to FIG. 8, line *a* shows the condition of the magnetic drum 30 after the recording of the trailing edge X of pulse Z. As stated above, the trailing edge X is superimposed upon the recording of the first pulse thereby erasing the leading edge I of the first pulse. As shown at line *b* of FIG. 8, it is desired to record an additional pulse so that the timing or the placing of its leading edge (herein designated $Z+1$) conveys the desired information. The trailing edge (denoted by the character W), which would normally be spaced from the leading edge by a distance T (see line *a* of FIG. 8), is suppressed by a given interval so that the trailing edge W is coincident with an edge of the pulse of the waveform *a* of FIG. 7. It is noted that the trailing edge W would be also coincident with a leading edge of the corresponding pulse of the waveform B of FIG. 6. Line C of FIG. 8 shows the resultant magnetization of the second track of the rotating magnetic drum 30. It can be seen that the spurious leading edge X has been removed and a leading edge $Z+1$ carrying the desired information has been superimposed. Though no spurious edges are present, the leading edge I of the first pulse to be recorded has been discarded. It can be arranged when recording that the first sample does not convey any desired information. However, it would be necessary to record a suitable pulse for the first sample at the first revolution in order that the track may be correctly magnetized during the interval *y*, which otherwise would not at any other time be recorded and its magnetization would be determined.

It is a significant aspect of this invention that the above described method requires no erasure or priming cycle before recording a new set of samples. This advantage results from the recording of consecutively placed pulses in opposite states of magnetization and maintaining the recording pulse for a sufficient duration so as to be superimposed on the adjacent sample of reverse polarity, thus automatically erasing any information previously existing on the drum 30.

Figure 9:
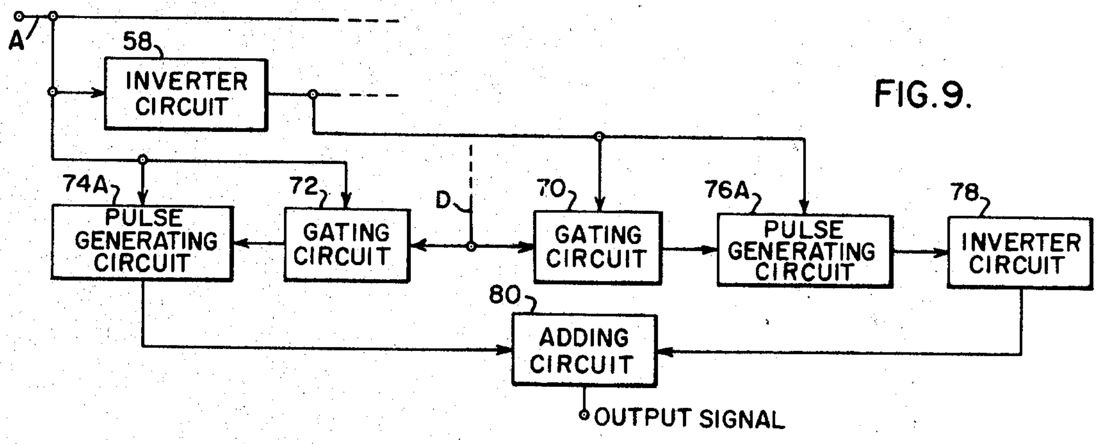
FIG. 9 shows a schematic diagram of an alternative embodiment of the pulse modulating circuit shown in FIG. 2, which may be used to pulse modulate randomly oriented pulses onto the recording medium of FIG. 1.
Figure 10:
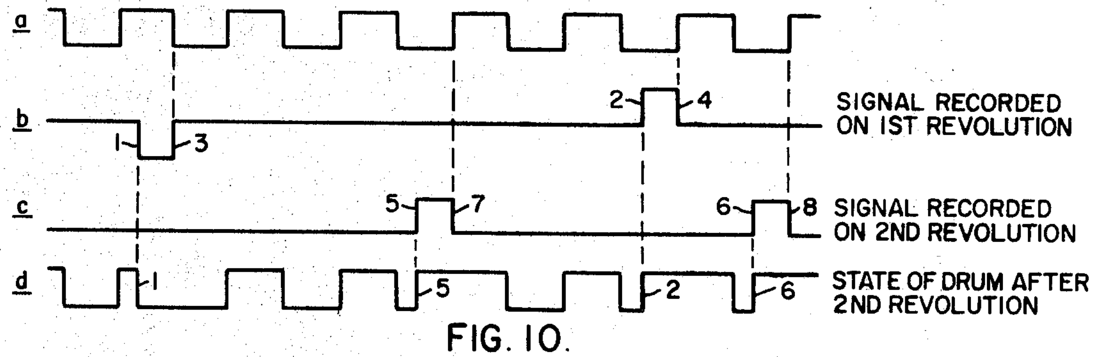
FIG. 10 is a graphic representation of the pulse modulation technique performed by the circuit of FIG. 9.

Referring now to FIGS. 9 and 10, an alternative embodiment of the system and method of recording will now be described, which permits the samples of the pulses to be recorded in a random sequence. In this alternative embodiment, the sample pulses do not have to be recorded adjacent to the samples recorded on previous revolutions of the magnetic drum 30. However, the alternative method requires that the recording track 34 of the magnetic drum be previously primed by recording the inverse of waveform A of FIG. 6. An illustrative representation of the waveform is shown at line *a* of FIG. 10 and is made up of an integral number of pulses of successively, opposite polarity. Those integral number of pulses are recorded about the circumference of the drum 30. As described with respect to FIG. 2, the input information from the source is used to control the duration of the pulse derived from a monostable circuit, which is triggered by a selected pulse, either positive or negative, of the clock pulse waveform. The method of selecting the triggering pulse from the clock waveform depends upon the application; it could, as before, be selected by a counter circuit producing an output signal after a given number of clock pulses have been timed. Thus illustratively, the random samples could be applied to a monostable circuit similar to circuit 68 of FIG. 2. As discussed above, the timing of the trailing edge of the output signal of the monostable circuit is a function of the amplitude of the input signal. The waveform D of FIG. 6 could be applied to the gating circuits 72 and 70 as shown in FIG. 9. As previously described, a continuous clock waveform A similar to that shown in FIG. 6 (and FIG. 10) would be applied to the gating circuit 72, and through the inverter circuit 58 to the gating circuit 70. The circuit 72 gates the waveform D of FIG. 6 in response to the positive going edges of the continuous, clock waveform A of FIG. 6 as described above. Illustratively, the trailing edge of the clock waveform A could be applied to a pulse generating circuit 74A. The waveform D will also be gated by the circuit 70 to be applied to a pulse generating circuit 76A in response to a signal derived from the inverter circuit 58. More specifically, in this illustrative embodiment, the negative edge of the clock waveform A of FIG. 6 will cause the gating circuit 70 to apply the waveform D derived from the monostable circuit to the pulse generating circuit 76A. Up to this point, the system is similar to the system of FIG. 2. However, the pulse generators 74A and 76A instead of producing constant width pulses, generate pulses having a trailing edge which is coincident with the leading edge of the next clock pulse. As shown in FIG. 9, the continuous clock waveform *a* is applied to the pulse generating circuit 74A and similarly, the continuous, clock waveform A is applied through the inverter circuit 58 to the pulse generating circuit 76A. As shown in line *b* of FIG. 10, the waveform recorded during the first revolution has been illustratively a pair of pulse whose leading edges 1 and 2 are timed or placed in accordance with the amplitude of the input signal. However, the trailing edges 3 and 4 coincide as shown in FIG. 10 (by comparison tween lines *a* and *b*) with trailing edges of the corresponding pulses of the clock waveform *a*.

As shown in FIG. 9, the output signals derived from the pulse generating circuit 74A are applied to an adding circuit 80 and the signals derived from the pulse generating circuit 76A are applied through the inverter circuit 78 to be applied to the adding circuit 80, which provides an output signal. The waveform of line *c* of FIG. 10 shows the signal recorded on the second revolution of the drum 30. It is particularly noted that the samples of pulses do not have to be adjacent or equally spaced from the pulses recorded during the first revolution as shown at lines *b* and *c* of FIG. 10. The leading edges 5 and 6 of the pulses of the waveform *c* of FIG. 10 convey the desired information of the two sampled signals, whereas the trailing edges 7 and 9 coincide with the trailing edges of the corresponding pulses of the clock waveform *a*. The condition of the track 34 of the magnetic drum 30 after two revolutions of recording is shown at line *d* of FIG. 10; it can be seen that the leading edges 1, 2, 5 and 6 have been recorded with the correct timing or spacing with regard to the leading edges of the corresponding pulses of the clock waveform shown at line *a*. After M revolutions of the magnetic drum 30 when all samples have been recorded, the leading edges of the original waveform *a* of FIG. 10 will have been erased, and each of the edges now recorded will contain the desired information.

This alternative method and system avoids the requirement that pulses be recorded adjacent one another on successive revolutions of the drum 30. However, a primary step is required to record the waveform *a* of FIG. 10 upon the recording track 34 prior to the recording of sampled pulses. Thus, it is not possible to record a new set of samples immediately following the recording of a first set of pulses. At least one revolution of the drum 30 is required to prime the track 34 before a new set of samples may be recorded. Either embodiment of this invention results in a recorded magnetic signal upon a continuous recording medium having two stored states wherein the recorded samples form a pulse waveform at the frequency of the clock waveform in which each of the positive and negative edges of the waveform are time modulated with respect to the clock waveform.

Figure 11:
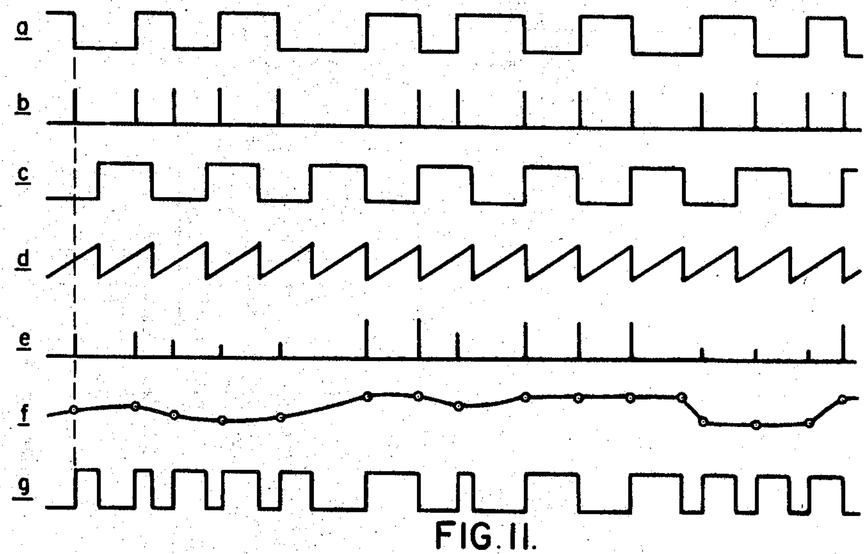
FIG. 11 shows a graphical representation of the playback of the pulse modulated signal recorded onto the drum shown in FIG. 1.

It is desired to playback the signal recorded upon the second track 34 in the sequence in which the samples are positioned on the drum 30 during a single revolution. As described above, a frame of television information may be scanned from the television camera device in a vertical mode as shown in FIG. 3 to be recorded upon the drum 30, which then may be read out to scan upon the cathode ray tube device 42 an image in a normal, horizontal scan pattern. Once the information is recorded upon the drum 30, it may be repeated on subsequent revolutions of the drum 30 as many times as desired. Referring now to FIGS. 1 and 11, an illustrative method of processing the signal derived from the recording head 47 will be explained. First, the signal (see line *e* of FIG. 7 and line *a* of FIG. 11) derived from the recording head 47 is applied to the differentiating circuit 82 to provide a waveform as shown at line *b* of FIG. 11 having a plurality of pulses of the same polarity, one pulse for each transistion of the waveform *a*. The continuous, clock waveform shown at line *c* of FIG. 11 is applied to the sawtooth generator 84 which functions to generate a sawtooth waveform as shown at line *d* of FIG. 11. The sawtooth waveform *d* is applied to the sampling circuit 86. The sampling circuit 86 provides an output signal shown at line *e* of FIG. 11 whose amplitude depends upon the relative timing at which the sawtooth waveform of line *d* is sampled by the pulses of line *b*. The waveform *e* is applied to the filtering circuit 88 to remove the pulse structure and to thereby provide a continuous waveform as shown at line F of FIG. 11 representing the recorded information.

It is noted that the information recorded upon the track 34 of the drum 30 may be processed by alternative methods and systems. For example, the waveform of line *b* of FIG. 11 which was derived from the differentiating circuit 82 may be applied to a bistable circuit to switch the circuit into one of its two states. Further, the clock waveform of line *c* of FIG. 11 is applied to the bistable circuit so that the subsequent edge whether positive or negative of the clock pulse waveform resets the bistable circuit to its original state. The waveform of the output signal of the bistable circuit is represented at line *g* of FIG. 11. The waveform of line *g* is a plurality of pulses whose width is determined by the timing of the leading edges of the pulses of the waveform of line *a* as derived from the second track 34 of drum 30. The amplitude modulation that was originally imposed upon the signal may be recovered by suitable integration techniques. Alternatively, the fundamental frequency component of the waveform played back from the drum 30 may be extracted. The phase of the resultant signal will be a function of the timing of the leading edges of these pulses; further, the recorded signal is a carrier which is phase modulated by the amplitude of the sampled signals. The carrier signal may be demodulated by conventional phase detector circuits, using the fundamental frequency of the clock-pulse waveform of line *a* of FIG. 11 as a reference phase.

In normal television practice, a single frame of a television image is made up of two fields which are interposed or interlaced with each other. The scan pattern as shown in FIG. 3 represents only the first field of an interlaced picture. If it was desired to interlace a second field upon the scan pattern of FIG. 3, the second field may be represented as a displaced set of samples $1_1'$, $2_1'$, etc. falling midway between the first and second horizontally disposed lines of the image. Referring now to FIG. 1, it would be necessary in order to record the second field to provide a third recording track 36 upon the magnetic drum 30. The sampled pulses could be applied to the third track 36 through a recording head 51. The signal may be derived from the television camera device by vertically scanning the target of the camera in a pattern as shown in FIG. 3; however, the signal is sampled intermediately between the points sampled previously. For example, an additional point would be sampled between $1_1$ and $1_2$, $1_2$ and $1_3$, etc. until an entire second field has been built up. Instead of applying the entire set of pulses to the second track 34, the sample pulses would be alternately applied first to the second track 34 and then to the third track 36. Such a sampling operation could be performed by switching circuit 38 which is connected between the output of the pulse modulating circuit 50 and the recording heads 44 and 51. Upon readout, a first field would be readout as explained above through a switching circuit 40. After the first field has been played back, the switching circuit 40 would be switched to play back the second field through a playback head 48 from the third recording track 36.

Alternatively, a second vertical, sweep similar to that of FIG. 3 could be employed to record the second field on the third track 36. In this alternative method, the target element of the television camera device would be scanned to provide an entire first field and then would be scanned a second time to provide a second field, which would be applied by the switching circuit 38 to the recording head 51. In order to replay the recorded signals, the switching circuit 40 would first play back the entire first field from the track 34 and then the entire second field from the track 36 to provide the desired interlaced frame of information to be displayed upon the cathode ray tube device 42.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

I claim:

1. A method of recording a signal on a continuous loop, storage medium having first and second storage states, said method including the steps of: establishing a clock waveform having an integral number of cycles alternating between first and second polarities disposed about a loop of said storage medium, said cycles being of equal width, sampling a first portion of said signal to record a first pulse upon said storage medium in said first storage state, an edge of said first pulse being recorded with respect to a corresponding cycle of said clock waveform in accordance with the amplitude of said sampled first portion; and sampling a second portion of said signal to record a second pulse adjacent to said first pulse upon said storage medium in said second storage state, said second pulse overlapping a portion of said first pulse and having an edge recorded with respect to the corresponding cycle of said clock waveform in accordance with the amplitude of said sampled second portion.

2. A method of recording as claimed in claim 1, wherein said first pulse occurs when the corresponding cycle of said clock waveform is of a first polarity and said first pulse is accordingly recorded in said first storage state, and said second portion occurs when said corresponding cycle of said clock waveform is of said second polarity and said second pulse is recorded in said second storage state in accordance with the polarity of said clock waveform.

3. A method of recording as claimed in claim 1, wherein said continuous loop and storage medium is repeatedly moved past a recording head through a plurality of revolutions.

4. A method of recording as claimed in claim 3, wherein said clock waveform is recorded upon a first track of said continuous loop storage medium, and said first and second pulses are recorded upon a second track of said continuous storage medium.

5. A method of recording as claimed in claim 3, wherein said first pulse is recorded during a first revolution of said storage medium and said second, adjacent pulse is recorded during a second revolution of said storage medium.

6. A method of recording as claimed in claim 3, wherein a second waveform similar to said continuous, clock waveform is recorded upon said storage medium and said first and second pulses recorded to be superimposed over second waveform.

7. A method of recording as claimed in claim 6, wherein the trailing edges of said first and second pulses coincide substantially with the trailing edge of the corresponding cycle of said second waveform.

8. A system for recording a signal including a continuous loop storage medium having the property of recording in first and second storage states, said storage medium having first and second tracks, a clock waveform made up of an integral number of cycles alternating between first and second polarities being disposed upon said first track; first means for sampling portions of said signal; second means associated with said first means for providing pulses having first edges which are displaced in time as a function of the amplitude of said signal with respect to the corresponding cycle of said continuous, clock waveform; third means for recording said pulses onto said second track of said storage medium; fourth means for moving said storage medium with respect to said third means; and fifth means for determining the storage state in which said pulses are recorded by said third means in accordance with the polarity of the corresponding cycle of said clock waveform so that adjacent pulses are recorded in different storage states.

9. A system for recording as claimed in claim 8, wherein there is included sixth means associated with said second track of said storage medium for playing back said recorded pulses, and seventh means associated with said sixth means for comparing said pulses with said clock waveform to provide an output signal which is proportional to the spacing between the edges of said pulses and an edge of the corresponding cycle of said clock waveform.

10. A system for recording as claimed in claim 8, wherein said storage medium has a third track, and said system further includes sixth means for recording said signal upon said third track, and seventh means for switching said pulses between either of said second or third tracks.

11. A system for recording as claimed in claim 8, wherein said second means provides that the second edges of said pulses coincide with an edge of the corresponding cycle of said continuous clock waveform.

12. A system for recording as claimed in claim 8, wherein said first means samples portions of said distributed signal so that adjacently recorded pulses are sampled on successive revolutions of said continuous loop storage medium.

References Cited

UNITED STATES PATENTS

| | | | |
|---|---|---|---|
| 3,378,825 | 4/1968 | Offner | 179—100.2 XR |
| 3,403,231 | 9/1968 | Slaton | 179—100.2 |
| 3,470,313 | 9/1969 | Bockwoldt | 178—6 |

BERNARD KONICK, Primary Examiner
G. M. HOFFMAN, Assistant Examiner

U.S. Cl. X.R.

178—6.6; 179—100.2; 340—174.1